(12) United States Patent
Louis et al.

(10) Patent No.: US 8,302,742 B2
(45) Date of Patent: Nov. 6, 2012

(54) SELF-SETTING AUTOMATIC SLACK ADJUSTER WITH INCREASED DURABILITY

(75) Inventors: John Louis, Elyria, OH (US); Zoltan Tormasi, Kecskemét (HU)

(73) Assignee: Bendix Spicer Foundation Brake LLC, Elyria, OH (US)

(*) Notice: Subject to any disclaimer, the term of this patent is extended or adjusted under 35 U.S.C. 154(b) by 994 days.

(21) Appl. No.: 12/273,235

(22) Filed: Nov. 18, 2008

(65) Prior Publication Data

US 2010/0122878 A1 May 20, 2010

(51) Int. Cl.
*F16D 51/00* (2006.01)
(52) U.S. Cl. .................................. 188/79.55; 188/72.9
(58) Field of Classification Search .............. 188/79.55, 188/72.9, 71.7–71.9, 79.51
See application file for complete search history.

(56) References Cited

U.S. PATENT DOCUMENTS

| | | | |
|---|---|---|---|
| 3,921,765 A | 11/1975 | Swander, Jr. | |
| 4,380,276 A | 4/1983 | Sweet et al. | |
| 4,440,268 A | 4/1984 | Karlsson | |
| 4,484,665 A | 11/1984 | Svensson | |
| 5,327,999 A | 7/1994 | Nelander | |
| 5,664,647 A | 9/1997 | Edvardsson | |
| 7,198,138 B2 | 4/2007 | Chadha et al. | |
| 2007/0209889 A1* | 9/2007 | Echambadi et al. | 188/196 D |

FOREIGN PATENT DOCUMENTS

WO WO 03/083322 A1 10/2003

OTHER PUBLICATIONS

International Search Report mailed Dec. 23, 2009.

* cited by examiner

*Primary Examiner* — Melanie Torres Williams
(74) *Attorney, Agent, or Firm* — Crowell & Moring LLP

(57) ABSTRACT

An improved self-adjusting automatic slack adjuster for reducing slack in the brake of a vehicle, in which a one-way clutch assembly is arranged in the housing of the automatic slack adjuster housing such that a thin-wall region of the housing associated with the gear drive of the one-way clutch assembly is located outside of a load path through which brake applications forces are conveyed from a brake actuator to a brake cam shaft upon which the automatic slack adjuster is located. The new positioning of the one-way clutch assembly drive results in unexpectedly lower stress levels in the automatic slack adjuster, resulting a more durable slack adjuster and permitting surprisingly large increases in slack adjuster capacity rating.

5 Claims, 6 Drawing Sheets

SELF-SETTING AUTOMATIC SLACK ADJUSTER WITH INCREASED DURABILITY

BACKGROUND AND SUMMARY OF THE INVENTION

The present invention relates to brakes used on, for example, commercial truck or trailer axles, and in particular to automatic slack adjusters which eliminate excess motion in a brake actuator mechanism used to apply the brake.

Over the life of the brake linings of a brake, such as a pneumatic drum brake used on commercial vehicle axles, as the brake's friction linings wear the clearance between the brake linings and their respective friction surfaces (for example, the inner surface of a brake drum) increases. This increasing clearance requires an ever-increasing range of motion from the brake actuator mechanism to move the brake linings from their rest position to the point at which the linings contact the friction surface.

It has become commonplace to include an automatic slack adjuster in the mechanical path between the brake actuator and the brake linings so as to eliminate excess lining travel slack as the brake linings wear. Such adjusters typically are: (i) located on a portion of a brake cam shaft which is outside of the brake (typically splined to the cam shaft); and (ii) coupled to a pushrod of a brake actuator such that when the brake actuator push rod is extended or retracted, the slack adjuster rotates about the longitudinal axis of the brake cam shaft. Thus, by extending or retracting the brake actuator pushrod, the slack adjuster causes the brake cam shaft to rotate about its longitudinal axis, which in turn rotates a brake actuation cam affixed to the end of the brake cam shaft located within the drum brake. The rotation of the cam either presses the brake linings into engagement with the brake drum inner friction surface or allows the brake linings to withdraw radially inward, away from the friction surface.

Automatic slack adjusters are typically designed to transmit brake actuator force to the brake cam shaft in the brake application direction with no relative motion between the adjuster and the brake cam shaft. When the brake actuation force is withdrawn, if there is greater than desired distance between the brake linings and the brake drum friction surface, the slack adjuster is permitted to rotate relative to the brake cam shaft an angular distance sufficient to remove some or all of this undesired slack, i.e., limiting the distance the brake linings withdraw from the brake drum friction surface so that the lining-drum clearance is maintained at a desired minimum.

In many automatic slack adjusters, a one-way clutch is used to accomplish the rotary adjusting movement, with a worm shaft located in the adjuster turning a worm gear (also known as a worm wheel; collectively, a "gear set" or "gear train"). The worm gear is coupled, typically via splines, to the brake cam shaft. When the brake actuator pushrod is retracted, the worm shaft rotates about its longitudinal axis, causing the worm shaft and worm gear to move relative to one another in a circumferential direction about the circumference of the worm gear. This relative movement of the worm shaft and gear creates corresponding relative motion between the slack adjuster body and the brake cam shaft. As a result, when the brake actuator pushrod returns to its rest position the brake cam shaft does not return to its original rest position. Instead, the brake cam shaft only rotates through a smaller angle to a new rest position. The brake application cam thus stops in a corresponding new rest position at which the brake linings are maintained closer to the brake drum friction surface. Because the rotation of the slack adjuster relative to the brake cam shaft results in reduction of brake lining clearance in the new rest position, the automatic slack adjuster compensates for brake lining wear.

Previously, automatic slack adjusters have had their one-way clutch mechanism, and in particular the gear which drives the one-way clutch, located adjacent to the worm shaft, in bores in the automatic slack adjuster housing. As shown in each of prior art FIGS. 1-3, corresponding respectively to FIG. 3 of U.S. Pat. No. 4,484,665, FIG. 1 of U.S. Pat. No. 5,327,999, and FIG. 1 of International Patent Application No. WO 03 083322, the one-way adjustment mechanisms (including, respectively, control worms 29, 15, and unlabeled worm engaging worm teeth 6) are located in their housings (respectively, 13, 1 and unlabeled cross-sectioned body) on the side of brake cam shaft (respectively, 4, 3, 3) which is in the brake actuation direction (illustrated by brake actuation direction arrows).

As shown by way of these examples of the prior art, the one-way clutch mechanisms have been located on the brake actuation direction side of the automatic slack adjuster housings for a number of reasons, including that this location avoids the relatively space-constrained region behind the automatic slack adjuster. Due to the location of various components such as brake actuator support brackets in this region, placing the adjustment mechanism on the brake actuation direction side of the slack adjuster allows the designer greater freedom to package the one-way adjustment device within the slack adjuster housing. The close quarters with other components in the vicinity of the automatic slack adjuster also has provided an incentive to locate the adjustment mechanism on the brake actuation direction side of the slack adjuster in order to ease access to the adjuster for in situ manual operation of the adjustment mechanism by a technician.

A significant problem with prior art automatic slack adjusters, however, is that during brake application the reaction force transmitted via the worm gear and worm shaft is focused in the same area of the housing where the adjustment mechanism is located. Thus, the forces of the brake application and the reaction forces generated by the worm gear set combine to apply very high stresses to the thin-section wall of the housing adjacent to the bore containing the gear drive of the one-way clutch adjustment mechanism and the bore through which the brake cam shaft passes (for example, in prior art FIG. 2, the thin wall section directly behind the intersection of the teeth of gears 12, 15). The high stresses in this thin wall region greatly reduces the durability of the prior art automatic slack adjusters.

Despite industry-wide awareness and attention to the high stresses on the housings and resulting durability problems, this issue has not been satisfactorily addressed prior to the present invention. For example, some have tried to improve durability by incrementally increasing the thickness of the thin wall portion of the slack adjuster housing, but this alternative has proven to be of limited utility because an increase in the size of the thin wall section necessitates a corresponding increase in the size of the spur gear which cooperates with the adjuster. The larger spur gear in turn requires a larger spur gear seat, which causes a concomitant increase in the local housing stresses which offsets improvements obtained from increasing the thickness of the thin-wall section. Further, as is recognized in the art, significantly increasing the size of the automatic slack adjuster housing is not a practical alternative due to the limited space envelope in the regions of the wheel and brake components at an axle end.

In view of the foregoing, it is an objective of the present invention to provide an improved automatic slack adjuster with superior durability. In addressing these and other objectives, the present invention provides a solution to the problems of the prior art by moving the thin-section wall to a region behind the brake cam shaft and worm gear, i.e., to the side of the automatic slack adjuster housing which is way from the brake actuation direction. In an unexpected development, we determined that this arrangement of the one-way adjustment mechanism components results in an automatic slack adjuster design which surprising leads to far lower stress levels in the thin-wall regions of the automatic slack adjuster that experienced in the thin-section wall regions of prior art automatic slack adjusters.

In the present invention, thin-wall region associated with the adjustment mechanism is now located outside of the load path through which the majority of the brake application and reaction forces pass from the brake actuator pushrod to the brake cam shaft. Because the thin-wall region of the housing is free of the majority of the brake application stresses, this region is subjected to lower local stress levels. Surprisingly, the reduction of stress levels in the thin-walled region can be dramatic. For example, initial finite element stress calculations have indicated that thin-wall region stresses in the present invention's automatic slack adjuster arrangement may be less that one-third of the high stress levels in prior art automatic slack adjuster housing designs. The magnitude of the stress level decrease is far in excess of the incremental reductions previously observed in prior attempts to improve prior art slack adjusters, such as by the above-noted increase in the thickness of the thin-wall portion of the adjuster housing.

The greatly reduced localized stress level provided by the present invention provide corresponding greatly increased levels of durability. Alternatively, a portion of the increased load-bearing capacity of the present invention slack adjuster could be utilized by the designer to provide an automatic slack adjuster with a load capacity which is significantly higher that previously available in conventional automatic slack adjusters, without a corresponding increase in the automatic slack adjuster's size. Another alternative available to the designer would be use of the additional strength and durability margin to design a smaller and/or lighter slack adjuster, saving weight, cost and installation space while still providing sufficient durability for heavy-duty service, as in commercial vehicle brake service.

Other objects, advantages and novel features of the present invention will become apparent from the following detailed description of the invention when considered in conjunction with the accompanying drawings.

DETAILED DESCRIPTION OF THE DRAWINGS

Figure 1:
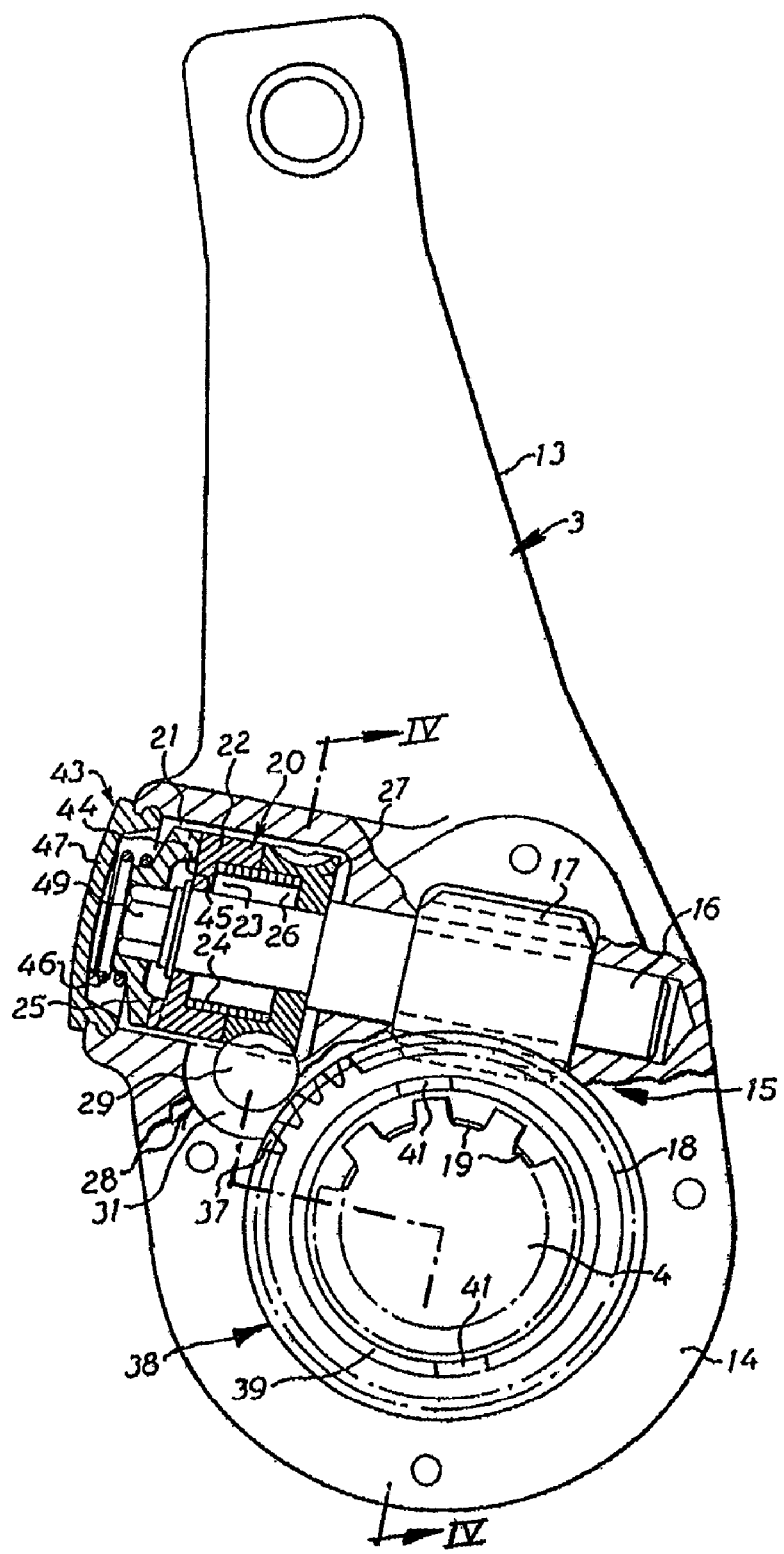
FIGS. 1-3 are cross-section views of prior art slack adjuster worm gear and one-way adjustment clutch arrangements.
Figure 2:
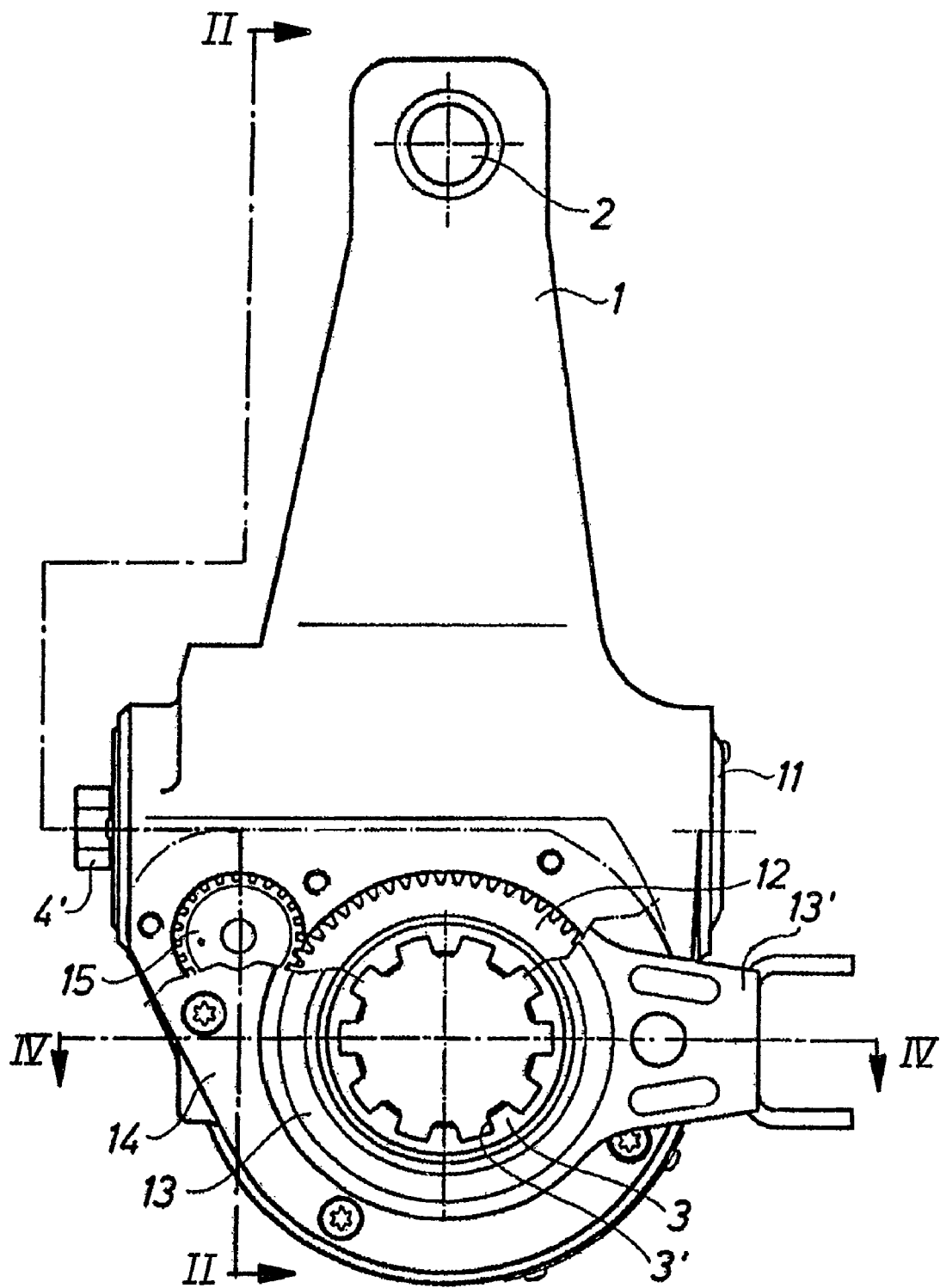
Figure 3:
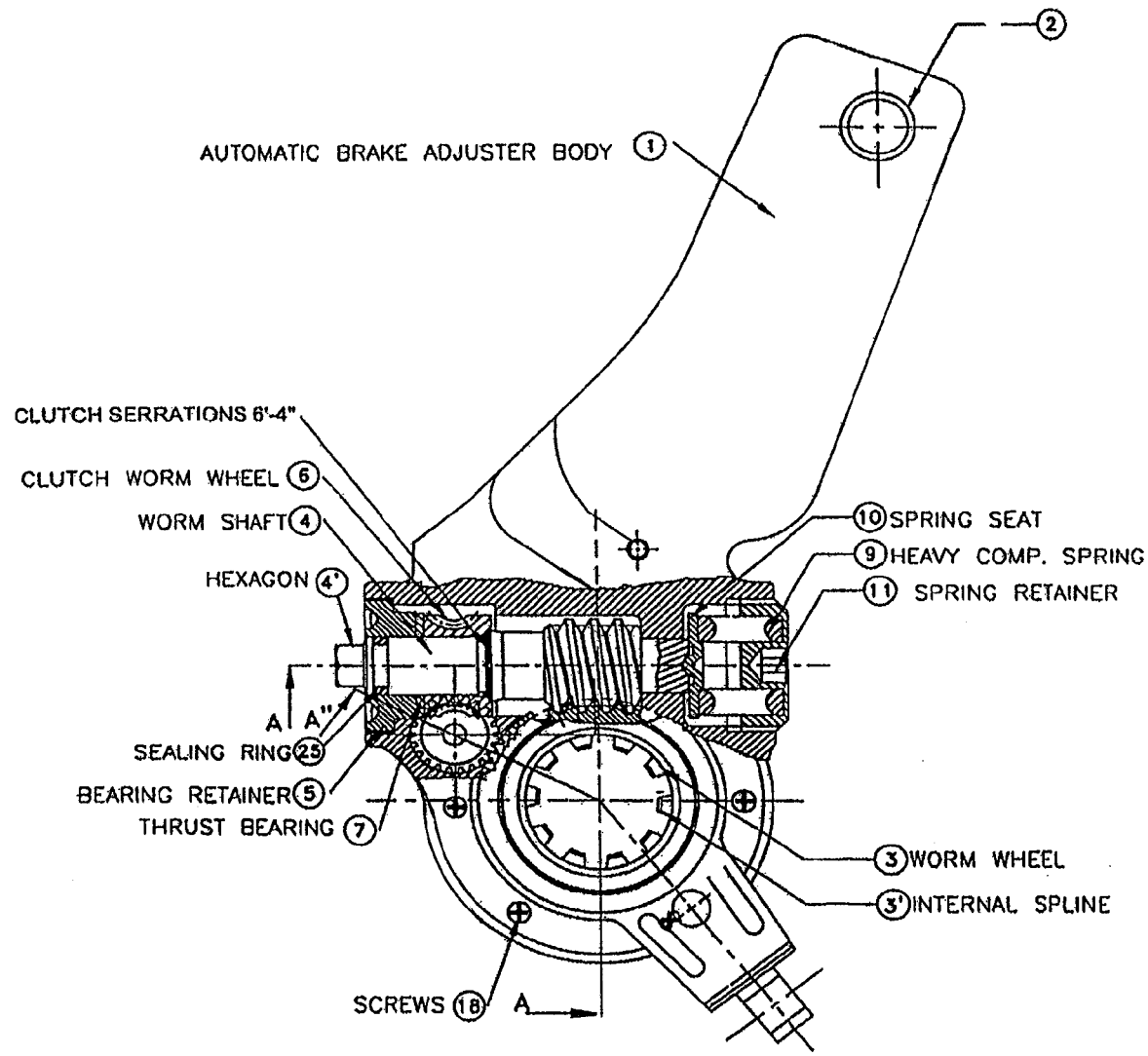
Figure 4:
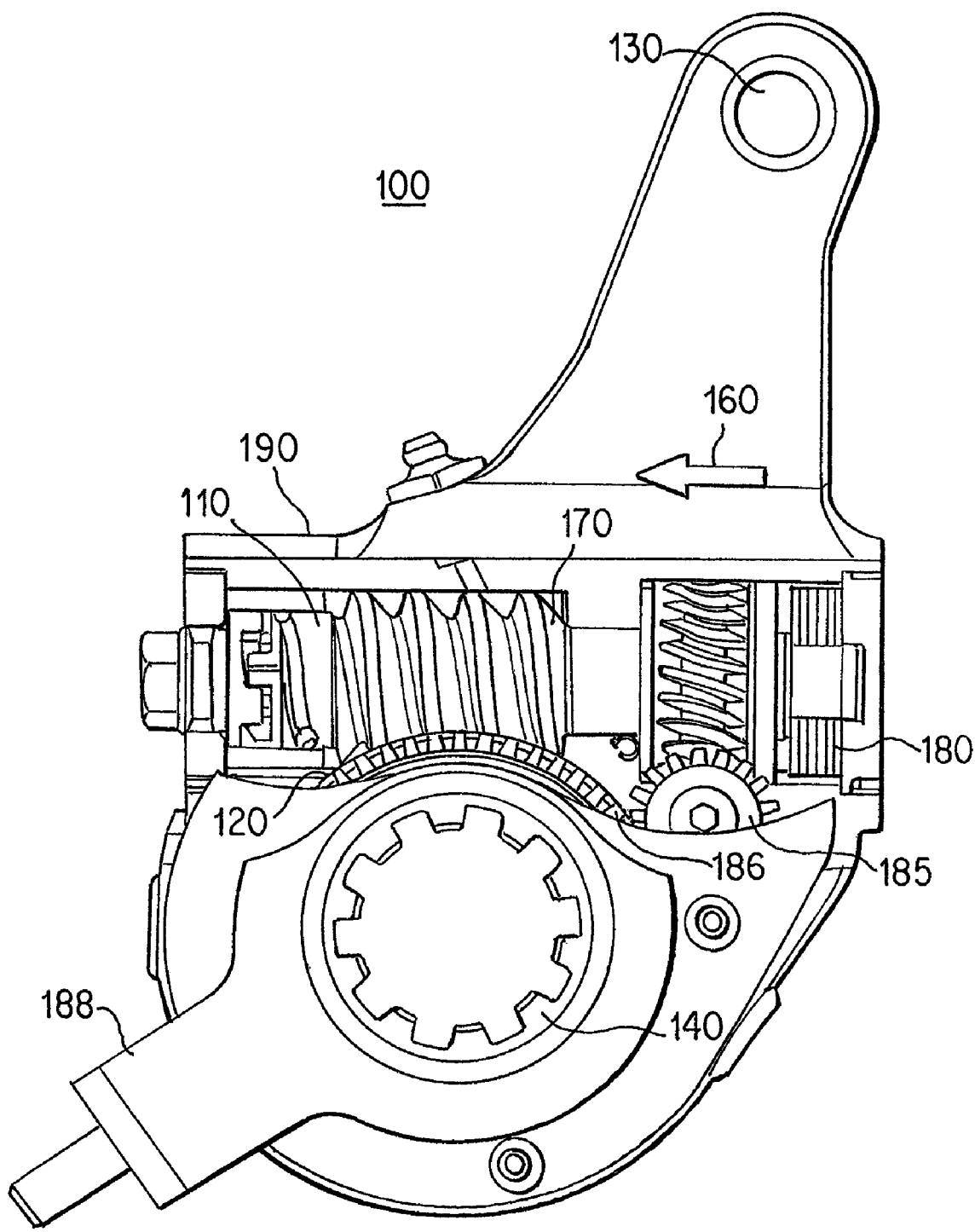
FIG. 4 is cross-section view of an automatic slack adjuster in accordance with an embodiment of the present invention.

FIG. 4 is cross-section view of an automatic slack adjuster 100, having a main gear set comprising a worm shaft 110 meshing with a worm gear 120, a brake actuator pushrod receiving hole 130 for coupling the automatic slack adjuster 100 to a brake actuator pushrod (not illustrated), and a splined coupling 140 either integrally formed with or otherwise coupled to the worm gear 120 to receive an end of a brake cam shaft 150. When the brake actuator pushrod pushes on the automatic slack adjuster in the brake application direction 160, the brake application force is transferred primarily through worm shaft seat 170 to worm shaft 110, and in turn through worm gear 120 to splined coupling 140 to rotate brake cam shaft 150 to apply the brake.

In the FIG. 4 embodiment, the one-way adjustment mechanism 180 is located on an end of the worm shaft which is facing away from the brake application direction 160, i.e., on the side of the automatic slack adjuster housing opposite brake application side 190. A worm wheel of the adjustment mechanism 180 is driven by control gear 185, which is located on the end of a transverse control worm shaft (not illustrated) which meshes with the adjustment mechanism worm wheel. The control gear 185 meshes with a fixed gear 187 on fixed reference arm 188.

Because the control gear 185 must be located near the fixed gear 187, a thin-wall section 195 is formed between the brake camshaft aperture and the transverse housing bore required to accommodate the transverse control worm on which control gear 185 rotates. By arranging the control gear 185 in the housing at a location which is rearward (i.e., away from the brake application direction) of the intersection of the worm shaft 110 and the worm gear 120, the thin-wall section is located in a portion of the automatic slack adjuster 100 which is relatively lightly loaded, as the principal compressive loading of the automatic slack adjuster by the brake actuator pushrod is on the brake application side 190.

Figure 5:
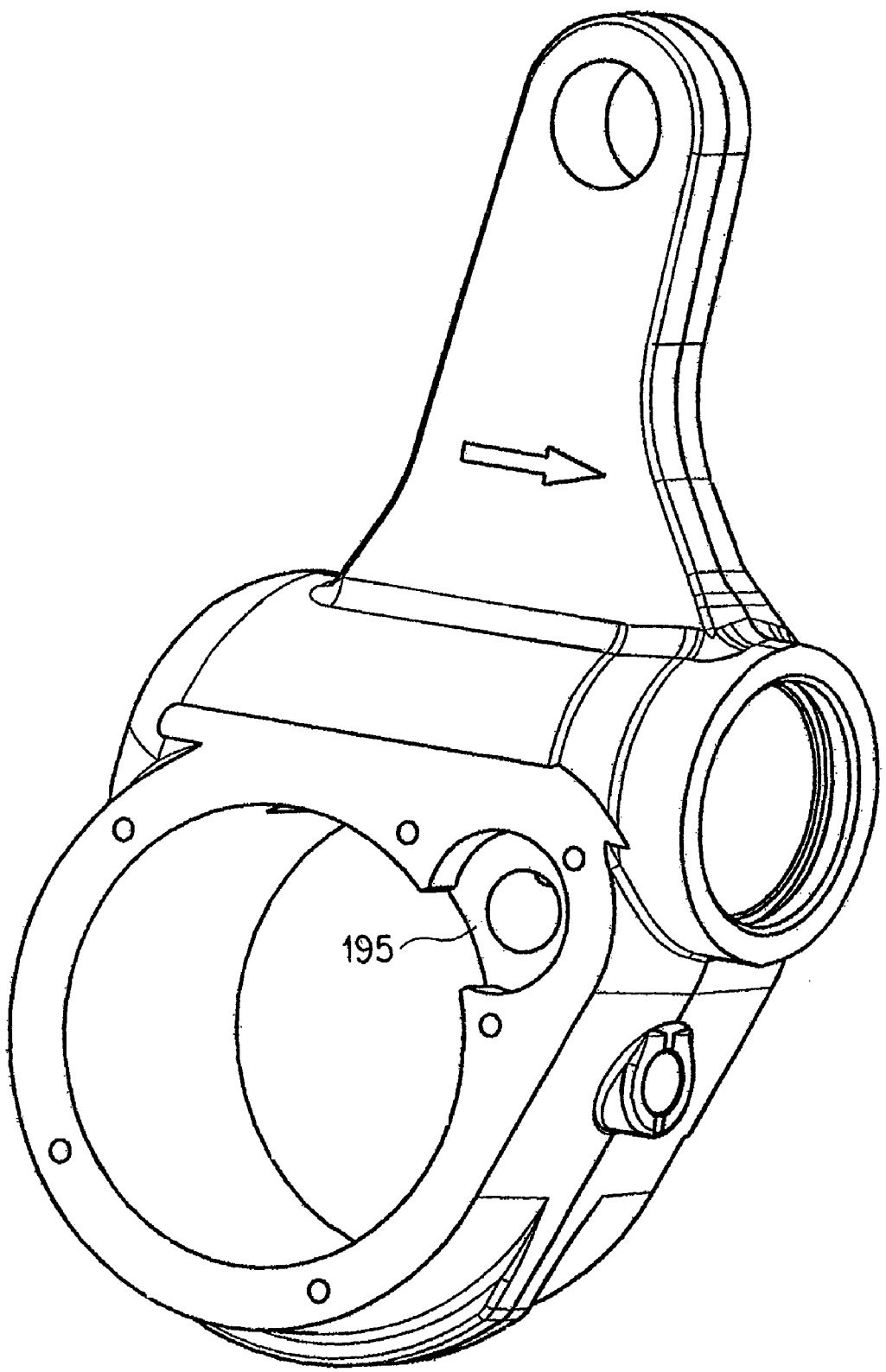
FIG. 5 is a view of a bare housing of an automatic slack adjuster in accordance with an embodiment of the present invention.

Accordingly, the thin-wall portion 195 of the automatic slack adjuster (shown for clarity in the FIG. 5 bare housing illustration without the gears of the adjustment mechanism) is not highly stressed. These lower local stress levels greatly improve the overall durability of the automatic slack adjuster. This is a significant improvement over prior art automatic slack adjusters, in which thin walls adjacent to brake application-side adjustment mechanisms were known to be highly-stressed weak areas. The lower stress levels realized by the present invention further provide the opportunity to provide an automatic slack adjuster which has a greatly enhanced load-bearing capacity as compared to prior art automatic slack adjusters, while maintaining essentially the same space envelope, an important factor in the space-constrained environment in and around an axle end on a vehicle.

Figure 6:
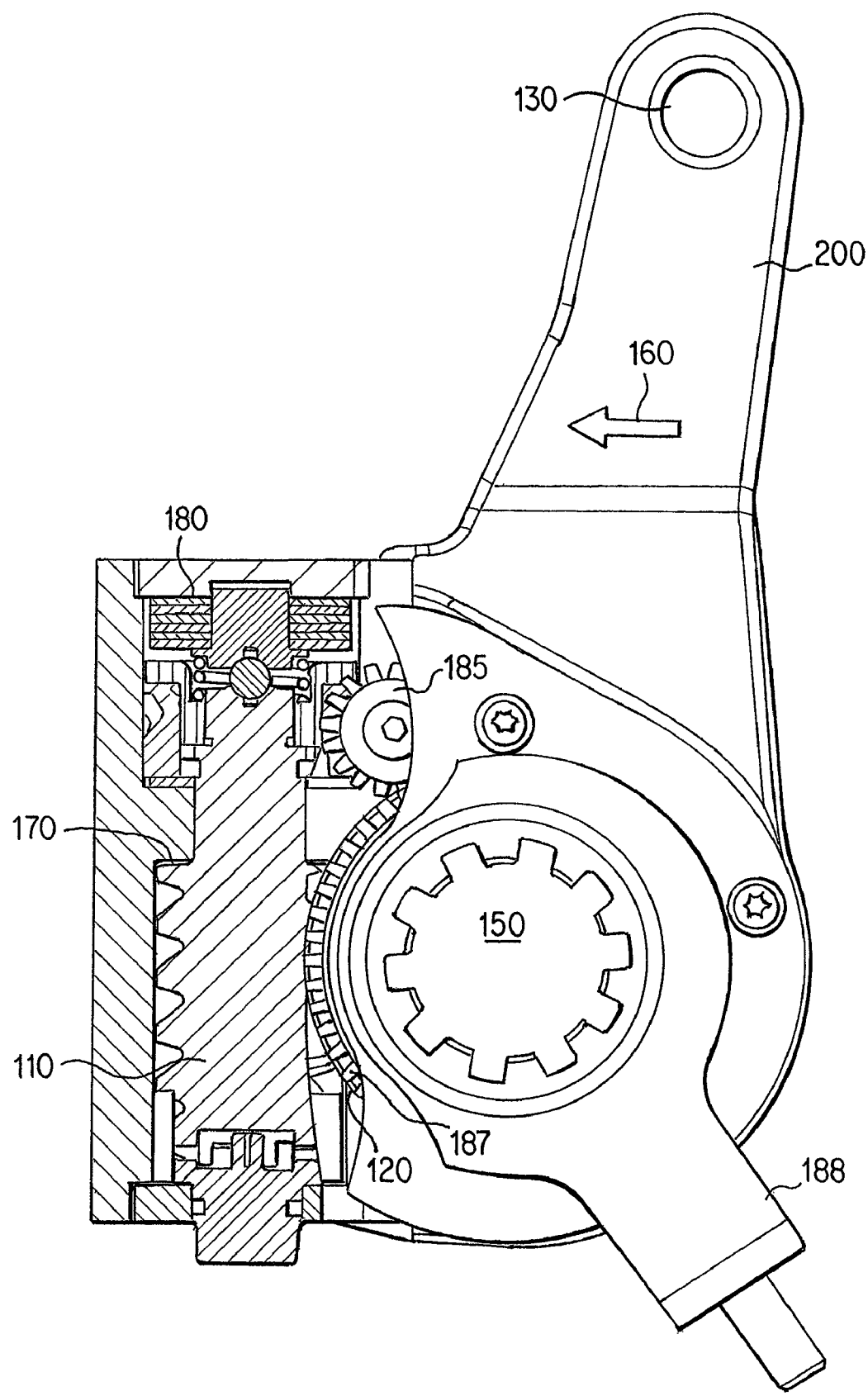
FIG. 6 is cross-section view of an automatic slack adjuster in accordance with an alternative embodiment of the present invention.

One alternative embodiment of the present invention is illustrated in FIG. 6. In this embodiment, the brake application load is transferred from the brake actuator pushrod (not illustrated) coupled to the adjuster 100 via connection 130 through the adjuster body to work shaft seat 170, and thence through worm shaft 110 and worm gear 120 to brake cam shaft 150. As compared to the embodiment shown in FIG. 4, the actuation arm 200 of the automatic slack adjuster is moved from a position in which the worm shaft 110 is between the arm 200 and the brake cam shaft 150 to a position in which the worm shaft 110 is not between the arm 200 and the brake cam shaft 150. Nonetheless, even in this arrangement the thin-wall section adjacent to the drive 185 of the adjuster mechanism 180 remains substantially away from the principal load path between the brake actuator pushrod and the brake cam shaft, and therefore the thin-wall section adjacent to the gear drive 185 also experiences only relatively low stress levels.

The foregoing disclosure has been set forth merely to illustrate the invention and is not intended to be limiting. For example, one of ordinary skill would recognize that the location of the one-way clutch assembly of the adjustment mechanism may vary along the axial length of the worm shaft, as long as the bore for the gear drive for the one-way clutch adjuster is located out of the primary brake application force load path through the automatic slack adjuster housing so as to minimize the stress in the thin-wall section between the gear drive bore and the brake camshaft bore. Because such modifications of the disclosed embodiments incorporating the spirit and substance of the invention may occur to persons skilled in the art, the invention should be construed to include everything within the scope of the appended claims and equivalents thereof.

What is claimed is:

1. An automatic slack adjuster, comprising:
   a housing having an aperture for receiving a brake cam shaft and a brake actuator arm arranged to receive a brake application force;
   a worm wheel co-axially located within the housing aperture and configured to co-axially engage the brake cam shaft in a manner which precludes rotation of the worm wheel relative to the brake cam shaft;
   an adjuster drive arranged to rotate the worm wheel relative to the housing; and
   a one-way clutch assembly with a one-way clutch assembly drive, the one-way clutch assembly
      being arranged to rotate the adjuster drive to drive rotation of the housing relative to the worm wheel, and
      having a control gear which drives the one-way clutch assembly,
   wherein
      the application of brake application force in a brake application direction to the brake actuator arm causes the housing to rotate about a rotation axis of the worm wheel, and
      the control gear is located in a region of the housing which is rearward relative to the brake application direction from of the location in the housing of the intersection of the worm shaft and the worm gear.

2. The automatic slack adjuster of claim 1, wherein when in an installed position on a vehicle axle, the housing rotates in a brake application direction when brake application force is applied to the brake actuator arm.

3. A vehicle brake, comprising:
   a brake actuator having a brake actuation pushrod;
   a brake arranged to be located on an axle of the vehicle and having a brake cam shaft, the brake cam shaft having a first end located at the brake and a second end distal from the brake, wherein rotation of the brake cam shaft about a longitudinal axis actuates the brake; and
   an automatic slack adjuster coupled between the brake actuator pushrod and the brake cam shaft to transfer motion of the pushrod to rotation of the brake cam shaft to apply a brake application force in a brake application direction to the automatic slack adjuster, the automatic slack adjuster comprising:
      a housing having an aperture for receiving the brake cam shaft and a brake actuator arm arranged to receive the brake application force;
      a worm wheel co-axially located within the housing aperture and configured to co-axially engage the brake cam shaft in a manner which precludes rotation of the worm wheel relative to the brake cam shaft;
      an adjuster drive arranged to rotate the worm wheel relative to the housing; and
      a one-way clutch assembly with a one-way clutch assembly drive, the one-way clutch assembly
         being arranged to rotate the adjuster drive to drive rotation of the housing relative to the worm wheel, and
         having a control gear which drives the one-way clutch assembly,
      wherein
         the application of brake application force to the brake actuator arm causes the housing to rotate about a rotation axis of the worm wheel, and
         the control gear is located in a region of the housing which is rearward relative to the brake application direction from of the location in the housing of the intersection of the worm shaft and the worm gear.

4. A vehicle, comprising:
   at least one axle having a brake, the brake including
      a brake actuator having a brake actuation pushrod;
      a brake located on an axle of the vehicle and having a brake cam shaft, the brake cam shaft having a first end located at the brake and a second end distal from the brake, wherein rotation of the brake cam shaft in a brake application direction about a longitudinal axis of the brake cam shaft actuates the brake; and
      an automatic slack adjuster coupled between the brake actuator pushrod and the brake cam shaft to transfer motion of the pushrod to rotation of the brake cam shaft to apply a brake application force to the automatic slack adjuster, the automatic slack adjuster comprising:
         a housing having an aperture for receiving the brake cam shaft and a brake actuator arm arranged to receive the brake application force;
         a worm wheel co-axially located within the housing aperture and configured to co-axially engage the brake cam shaft in a manner which precludes rotation of the worm wheel relative to the brake cam shaft;
         an adjuster drive arranged to rotate the worm wheel relative to the housing; and
         a one-way clutch assembly with a one-way clutch assembly drive, the one-way clutch assembly
            being arranged to rotate the adjuster drive to drive rotation of the housing relative to the worm wheel, and
            having a control gear which drives the one-way clutch assembly,
         wherein
            the application of brake application force to the brake actuator arm causes the housing to rotate about a rotation axis of the worm wheel, and
            the control gear is located in a region of the housing which is rearward relative to the brake application direction from of the location in the housing of the intersection of the worm shaft and the worm gear.

5. An automatic slack adjuster, comprising:
   a housing arranged to receive a brake application force from a brake actuator and having an aperture, for receiving a brake cam shaft
   means for adjusting a position of the housing relative to the brake cam shaft; and
   means for driving the position adjusting means, the driving means being located in a region of the housing which is rearward relative to the brake application direction from position adjusting means.

* * * * *